United States Patent [19]
Ando et al.

[11] Patent Number: 5,706,108
[45] Date of Patent: Jan. 6, 1998

[54] HOLOGRAM DISPLAY APPARATUS INCLUDING A CURVED SURFACE OF CONSTANT CURVATURE

[75] Inventors: Hiroshi Ando; Teiyuu Kimura, both of Nagoya, Japan

[73] Assignee: Nippondenso Co., Ltd., Kariya, Japan

[21] Appl. No.: 683,311

[22] Filed: Jul. 18, 1996

[30] Foreign Application Priority Data

Jul. 20, 1995 [JP] Japan ............... 7-207639

[51] Int. Cl.⁶ ............... G02B 5/32; G02B 27/01
[52] U.S. Cl. ............... 359/16; 359/19; 359/14
[58] Field of Search ............... 359/13–16, 19

[56] References Cited

U.S. PATENT DOCUMENTS

| | | | |
|---|---|---|---|
| 4,688,880 | 8/1987 | Tatsuno et al. | 359/19 |
| 4,832,427 | 5/1989 | Nanba. | |

FOREIGN PATENT DOCUMENTS

| | | | |
|---|---|---|---|
| 3421705A1 | 4/1986 | Germany | 359/16 |
| 56-46434 | 4/1981 | Japan. | |
| 57-60232 | 4/1982 | Japan. | |
| 360026905A | 2/1985 | Japan | 359/16 |
| 61-183605 | 8/1986 | Japan. | |
| 63-194222 | 8/1988 | Japan. | |
| 5-158394 | 6/1993 | Japan. | |
| 5-165391 | 7/1993 | Japan. | |
| 5-201272 | 8/1993 | Japan. | |

*Primary Examiner*—Jon W. Henry
*Attorney, Agent, or Firm*—Cushman, Darby & Cushman IP Group of Pillsbury Madison & Sutro LLP

[57] ABSTRACT

A hologram display apparatus in which chromatic aberration hardly occurs even when light of a wide bandwidth is used as a reproducing light. The apparatus has a hologram combiner 10 with a diffraction characteristic of lens, and is adapted to receive a signal light including information to be displayed and to generate, in response to the signal light, a reproduced light to be seen and acknowledged by an observer. The hologram combiner 10 has a curved surface with a constant curvature in at least one of a first direction and a second direction perpendicular to the first direction. The center 01 of curvature of the curved surface is positioned at substantially the same position of the center 02 of curvature of the lens equivalent to the hologram 11.

18 Claims, 11 Drawing Sheets

HOLOGRAM DISPLAY APPARATUS INCLUDING A CURVED SURFACE OF CONSTANT CURVATURE

BACKGROUND OF THE INVENTION

1. Field of the Invention

The present invention relates to a hologram display apparatus such as a head up display, and more particularly to a hologram display apparatus in which chromatic aberration can be reduced.

2. Description of the Related Art

During driving a normal vehicle, in order to ascertain the speed of the vehicle or the like, the field of vision must once be moved from outside the vehicle to the instruments on an instrument panel. This operation is inevitable during driving, however, it disturbs the driver. In addition, it has been said that frequent movements of the field of vision cause the driver to become tired.

Figure 12:
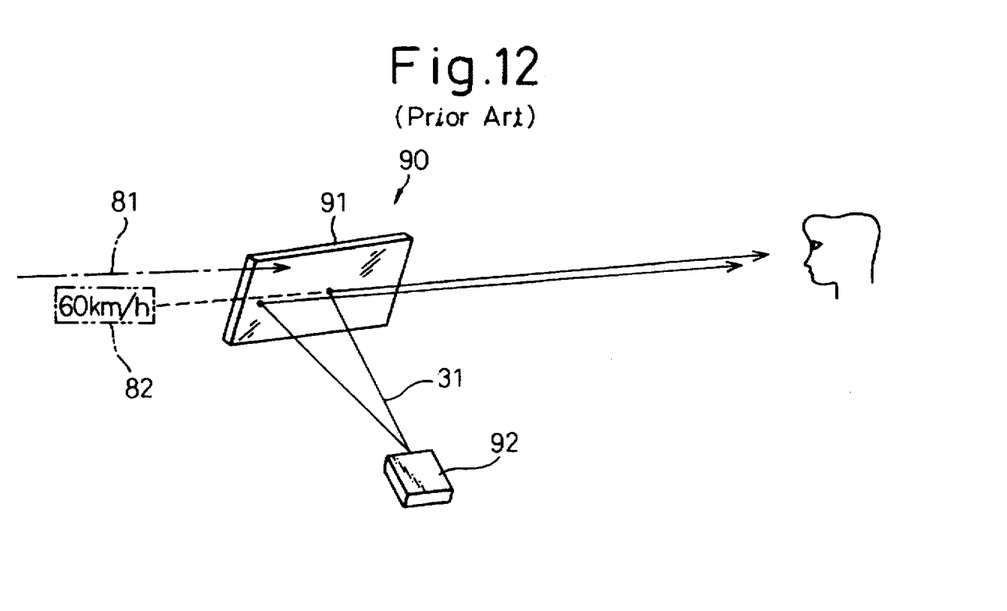
FIG. 12 is a system construction diagram of a conventional head up display apparatus.

For this reason, in recent years, a head up display 90 as shown in FIG. 12 has been proposed by which a driver can simultaneously see information such as speed information which is necessary during driving a vehicle and the outside view overlapped with the information.

As shown in FIG. 12, in the head up display 90, a hologram combiner 91 employing a reflection-type hologram is used as an image combiner for overlapping the above-mentioned optical information and the outside view with each other.

The hologram combiner 91 has such a diffraction characteristic as to efficiently reflect light of a particular selected wavelength band. Therefore, the hologram combiner 91 reflects, at a high efficiency, a light 31 emitted from a display unit (information light source) 92, whereas it has a high transmittance for light with wavelengths other than the above-mentioned particular wavelength band so that almost all of the lights 81 from the background can be transmitted therethrough.

By this, the brightness of both the outside, which can be seen through the hologram combiner 91, and the displayed information such as speed, which can be seen by being reflected by the hologram combiner 91, are not reduced.

The above-mentioned hologram combiner 91 has a diffraction characteristic of a magnifying mirror so that the driver can see an expanded image of a displaying image 82 emitted from the information light source 92.

In the prior art also, there is a display in which an additional stage of a hologram device is provided in front of the hologram combiner 91 in order to expand the image or to correct the distortion of the image. For example, in Japanese Patent Publication (Kokai) No. 5-201272, there is disclosed a method in which, in order to correct the distortion of the image of the hologram caused by the curvature of a windshield surface, a hologram device which is curved in the opposite direction to the curve of the windshield is provided.

Further, in Japanese Patent Publication (Kokai) No. 61-183605, there is disclosed a method in which, in order to suppress the distortion of the image due to the difference between the imaging positions at the central portion of the image and the peripheral portion of the image, a hologram of a cover glass (substrate) has a curved surface, the thickness is made not to be uniform, and so forth.

However, as a reproducing light for a head up display employing a hologram device, when a white light which can be obtained from an inexpensive light source is used, there are the following problems.

That is, in case the hologram device has a lens function as mentioned above, and when the white light having a wide bandwidth is used as a reproducing light, chromatic aberration is generated so that the displayed image becomes dim.

In more detail, a hologram has a diffraction characteristic by which a light of a particular wavelength is reflected.

When only the particular wavelength light is incident on the hologram, no chromatic aberration occurs even when the angle of incidence is not equal to the angle of reflection with respect to the normal line of a glass base plate of the hologram.

When a white light having a wide wavelength band is incident on the hologram, however, not only the light of the particular wavelength $\lambda$ is reflected by the hologram, but also the light of a wavelength slightly different from the particular wavelength ($\lambda \pm \Delta\lambda$) is also reflected. If the incident angle of this slightly different wavelength light is different from the angle of reflection, chromatic aberration occurs.

Therefore, when the white light is used as a reproducing light of the hologram, chromatic aberration is generated so that the displayed image becomes dim.

This chromatic aberration is produced because of the difference between an incident angle $\theta_i$ and an of reflection $\theta_r$. As a countermeasure for this, means for equalizing the incident angle $\theta_i$ and the angle of reflection $\theta_r$ are employed. In Japanese Patent Publication (Kokai) No. 63-194222, there is disclosed a method in which two hologram devices are used to correct the chromatic aberration.

By such countermeasures as mentioned above, however, the chromatic aberration for the light in proximity with the central axis (light axis) of the lens can be suppressed, however, there is a problem in that these countermeasures have almost no effect on the light which is incident on a position of the hologram far from the central axis.

Figure 13:
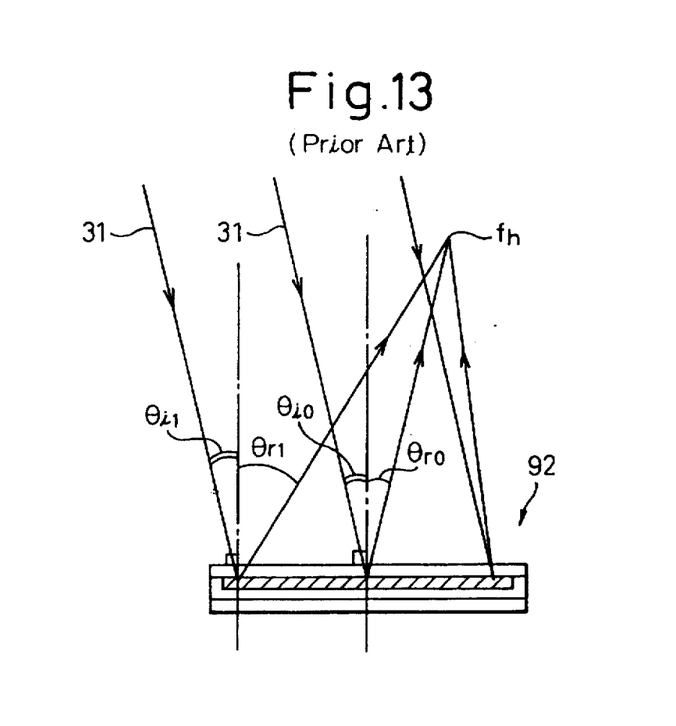
FIG. 13 is a diagram showing the relation between an incident angle and an angle of reflection in the hologram device of the conventional head up display apparatus.

That is, as shown in FIG. 13, even when the incident angle $\theta_{i0}$ and the angle of reflection $\theta_{r0}$ are made to be equal at the central portion of the hologram 92, it is inevitable that the incident angle $\theta_{i1}$ and the angle of reflection $\theta_{r1}$ at the edges of the hologram 92 have different values. Here and in the following, the width between the above-mentioned edges is an effective width actually seen and acknowledged by an observer. In the figure, the reference symbol $f_h$ represents a focus of the hologram lens. The stronger the lens function of the hologram lens 92, the more serious the deterioration, by the chromatic aberration caused by the difference between the incident angle and angle of radiation, becomes. Since the hologram generally has a shape longer in the right to left direction as shown in FIG. 12, such a chromatic aberration tends to easily appear.

SUMMARY OF THE INVENTION

In view of the above problems, an object of the present invention is to provide a hologram display apparatus in which chromatic aberration is hardly generated even when light of a wide bandwidth is employed as a reproducing light.

To attain the above object, there is provided, according to a first aspect of the present invention, a hologram display apparatus having a hologram device. The hologram device includes a first hologram with a diffraction characteristic of lens, and is adapted to receive a signal light including information to be displayed and to generate, in response to the signal light, a reproduced light to be seen and acknowledged by an observer. The hologram device has a curved surface with a constant curvature in at least one of a first direction and a second direction perpendicular to the first direction. The center of curvature of the curved surface is positioned at substantially the same position of the center of curvature of the lens equivalent to the hologram.

Since the hologram device has a curved surface as mentioned above, the difference between the incident angle and the angle of reflection can be largely decreased in the direction at which the surface is curved. As a result, the chromatic aberration can be largely suppressed so that an inexpensive light source which generates a white light can be used.

According to the second aspect of the present invention, the above-mentioned curved surface has the constant curvature in the first direction, and is flat in the second direction.

Since the curved surface of the hologram device curves only in one direction, the manufacturing of the hologram device is easy. That is, if the curved surface is a part of a spherical surface, it is difficult to form the spherical surface from flat plate because wrinkles are formed during manufacturing the spherical surface, and it is difficult to smooth the wrinkles. In contrast, when the surface curves only in one direction as in the present invention, the curved surface can be made easily from a flat plate without forming a wrinkle.

According to the third aspect of the present invention, the hologram device supports the hologram and comprises a transparent base plate located at the outgoing side of the reproduced light. The transparent base plate is formed to have the curved surface.

According to the fourth aspect of the present invention, the hologram device has a rectangular shape having a first side in the first direction and a second side in the second direction. The first side is longer than the second side.

In general, the difference between the incident angle and the angle of reflection is larger in the longer direction of the hologram. Since the curved surface extend in the first direction of the first side which is longer than the second side, the chromatic aberration can be efficiently reduced.

According to the fifth aspect of the present invention, it is preferable that the lens in the hologram has a characteristic of a spherical lens. In this case, the radius of curvature of the curved surface in the first direction is substantially the same as the radius of curvature of the spherical lens in the hologram.

By this construction, the center of radius of the curved surface substantially coincides with the center of radius of the spherical lens so that the difference between the incident angle and the angle of reflection can be made very small.

According to the sixth aspect of the present invention, the lens in the hologram is a magnifying lens having a characteristic of an aspheric lens. In this case, it is preferable that the radius of curvature of the curved surface in the first direction is substantially the same as the radius of curvature of an end portion of the lens equivalent to the hologram. This end portion corresponds to an edge of an area which can be seen and acknowledged by the observer.

Since the radius of curvature of the curved surface in the first direction is substantially the same as the radius of curvature of an end portion of the lens equivalent to the hologram, the average difference between the incident angle and the angle of reflection can be minimized so that the chromatic aberration can be suppressed most effectively, because the angle difference is a maximum at an end of the hologram.

According to the seventh aspect of the present invention, in the sixth aspect of the present invention, it is preferable that the magnifying lens has a first radius of curvature at one end in the first direction and a second radius of curvature, different from the first radius of curvature, at the other end in the first direction. In this case, it is preferable that the radius of curvature of the curved surface of the hologram is substantially equal to an average of the first radius and the second radius.

According to the eighth aspect of the present invention, the hologram device is an image combiner for combining the signal light projected on the front side of the image combiner with a background light from the backside of the image combiner, the combined light being adapted to be seen and acknowledged by the observer.

According to the ninth aspect of the present invention, the apparatus further comprises an image combiner for combining the signal light projected on the front side of the image combiner with a background light from the backside of the image combiner, the combined light being adapted to be seen and acknowledged by the observer, and the first hologram device being an optical element located in front of the image combiner, for projecting the signal light on the image combiner.

According to the tenth aspect of the present invention, the hologram is a reflecting type hologram.

According to the eleventh aspect of the present invention, the hologram is a transparent type hologram.

According to the twelfth aspect of the present invention, the apparatus further comprises a second hologram device located, along a light path, in series with the first hologram device.

According to the thirteenth aspect, it is preferable that the first hologram device having the curved surface is a hologram device for correcting chromatic aberration in the second hologram device.

According to the fourteenth aspect of the present invention, the first hologram device is located at a front side along the light path; the second hologram device is located at a rear side along the light path and has a flat shape; the curved surface of the first hologram device has a radius R1 of curvature expressed as: $R1=2(f1 \cdot f2+f1 \cdot L-L^2)/(f1+f2-L)$ where f1 is a focal length of said hologram in the first hologram device, f2 is a focal length of a hologram in the second hologram device, and L is the distance between both of the first hologram device and the second hologram device.

According to the fifteenth aspect of the present invention, the first hologram device is located at a rear side along the light path; the second hologram device is located at a front side along the light path and has a flat shape; the curved surface of said first hologram device has a radius R1 of curvature expressed as:

$$R1=2(f1 \cdot f2-f2 \cdot L)/(f1+f2-L)$$

where f1 is a focal length of the hologram in the first hologram device, f2 is a focal length of a hologram in the second hologram device, and L is the distance between both of the first hologram device and the second hologram device.

When the two hologram devices are provided as mentioned above, only one of the hologram devices may be flat. Therefore, it becomes easy to manufacture the hologram devices.

By setting the radius of curvature of the curved surface to be equal to R1 as mentioned above, the two hologram lens can be considered as a single synthesized hologram lens having a focal length $f_s$ corresponding to a focal point $F_s$. Thus, the chromatic aberration can also be effectively corrected. That is, by making the curved surface to have a radius of curvature equal to double of the focal length $f_r$, the same correction effect as in the first aspect of the present invention can be attained.

According to the sixteenth aspect of the present invention, the curved surface of the first hologram device is covered by a non-reflecting coating for preventing unwanted light due to reflection.

According to the seventeenth aspect of the present invention, the hologram display apparatus is a head up display apparatus for a vehicle, comprising: a windshield; an image combiner provided on the windshield; and an information light source, provided in said vehicle, for emitting said signal light; a view outside the vehicle can be seen and acknowledged by the observer through the image combiner, and an image reproduced from the signal light emitted from the information light source can be seen and acknowledged the imagserver by overlapping the image on the views.

According to the eighteenth aspect of the present invention, a first direction of the curved surface of the hologram device is the right and left direction of the vehicle.

BRIEF DESCRIPTION OF THE DRAWINGS

The above object and features of the present invention will be more apparent from the following description of the preferred embodiments when read in conjunction with the accompanying drawings, wherein.

DESCRIPTION OF THE PREFERRED EMBODIMENTS

Throughout the description, the same reference numerals or symbols represent the same or similar parts.

Embodiment 1

Figure 1:
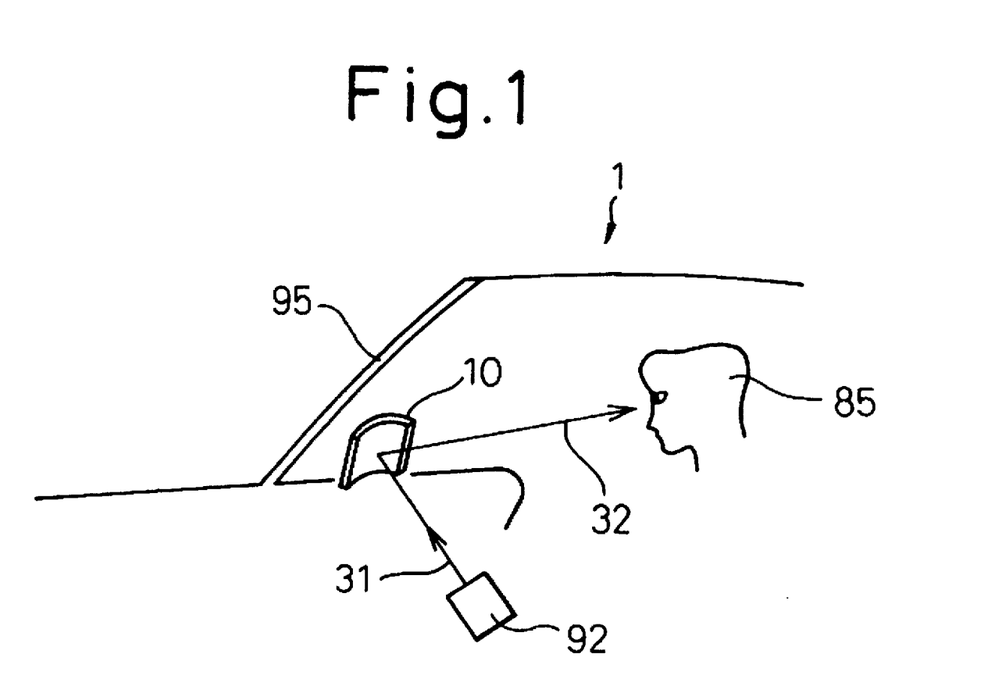
FIG. 1 is a system construction diagram showing a head up display according to the first to fifth embodiments of the present invention.

FIG. 1 is a system construction diagram showing a head up display apparatus 1 as an embodiment of a hologram display apparatus according to the present invention. In FIG. 1, the hologram display apparatus includes a hologram device such as a hologram combiner 10, an information light source 92 for generating a signal light 31 including information to be displayed, and a windshield 95 of a vehicle. The hologram combiner 10 is provided on the windshield 95.

In operation, the signal light 31 generated from the information light source 92 is projected on the hologram combiner 10. The hologram combiner 10 combines the signal light 31 and a view outside of the vehicle to form a reproduced light 32 which is seen and acknowledged by an observer 85 such as a driver.

Figure 2A:
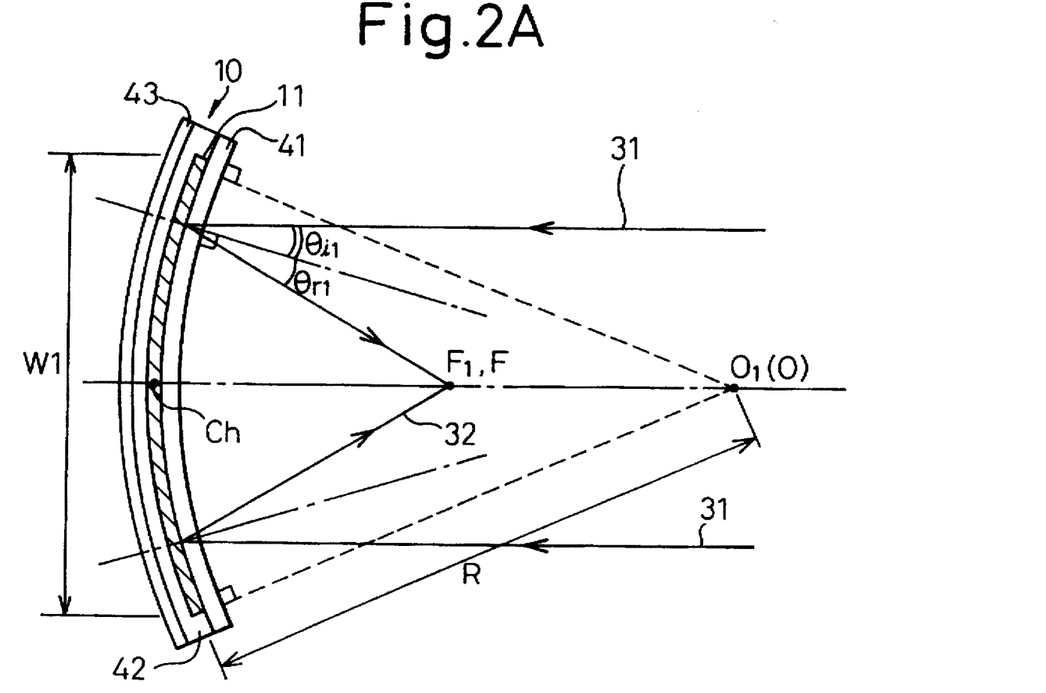
FIG. 2A is a schematic cross-sectional view of a hologram combiner according to the first embodiment of the present invention.
Figure 2B:
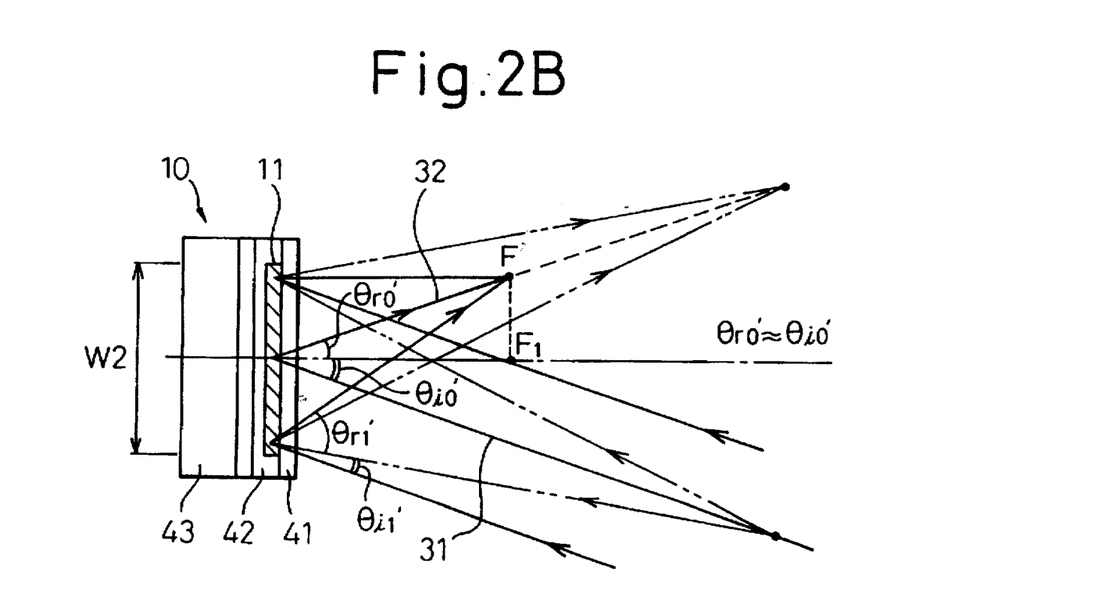
FIG. 2B is a longitudinal section of the hologram combiner of FIG. 2A.

FIG. 2A is a schematic cross-sectional view of a hologram combiner according to a first embodiment of the present invention, and FIG. 2B is a longitudinal section of the hologram combiner of FIG. 2A. As shown in FIG. 2A, the hologram combiner 10 includes a hologram 11 having a diffraction characteristic of magnifying mirror, or in other words, a concave mirror, a base plate 41 on which the hologram 11 is stuck, a cover 43 and adhesives 42 for adhering the hologram to the base plate 41 and to the cover 43.

The hologram combiner 10, and accordingly the hologram 11, has a curved surface such as a part of a cylinder or a conical surface having an approximately constant curvature in a first direction, i.e., the left to right direction of the windshield 95, and a non-curved surface in a second direction, i.e., the upper to lower direction of the windshield 95, perpendicular to the first direction. W1 denotes an effective lateral width of the hologram 11 in the above-mentioned first direction. W2 denotes an effective longitudinal width of the hologram 11 in the above-mentioned second direction. The lateral width W1 and the longitudinal width W2 correspond to the range which can be seen and acknowledged by the observer 82. The width W1 in the first direction is longer than the width W2 in the second direction.

The magnifying mirror in the hologram 11 has a characteristic of a spherical mirror. According to the invention, the radius of curvature of the hologram 11 in the above-mentioned first direction is made to be almost the same as the radius of curvature of the surface of a concave mirror in the hologram 11.

A reference symbol F denotes a focal position of the hologram 11; a reference symbol $F_1$ denotes a focal position of the concave mirror in the hologram 11; a reference symbol O denotes the center of curvature of the hologram 11; a reference symbol $O_1$ denotes the center of curvature of the concave mirror in the hologram 11; and a reference symbol Ch denotes the center of the curved surface in the first direction. As can be seen from FIG. 2A, in the above-mentioned first direction, the focal position F of the hologram 11 almost coincides with the focal position $F_1$ of the concave mirror in the hologram 11; and the center of curvature of the hologram 11 almost coincides with the center of curvature of the concave mirror in the hologram 11. Therefore, the radius R of curvature of the curved surface of the hologram 11 is almost the same as double the focal length f1 (=$ChF_1$) of the mirror surface equivalent to the hologram 11.

As shown in FIG. 2B, in the direction where the hologram 11 is not curved, even when its characteristic is so made that there is no angle difference between the incident angle $\theta_{i0}'$ and the reflection angle $\theta_{r0}'$ at the center thereof, the angle difference $\Delta\theta'$ between the incident angle $\theta_{i1}'$ and the reflection angle $\theta_{i0}'$ at the end of the hologram 11 becomes large. However, since the length W2 in the second direction in which the surface is not curved is relatively short in comparison with the length W1 in the first direction, the angle difference $\Delta\theta'$, with respect to the second direction, between the incident angle $\theta_{i1}'$ and the reflection angle $\theta_{r1}'$ at the end of the hologram 11 does not cause a serious problem as a whole.

Accordingly, in the hologram 11 of this embodiment, the chromatic aberration can be suppressed or lowered sufficiently. Therefore, even when a white light or a light with a wide band is used as a reproducing light for the information light source 92, the problem of chromatic aberration hardly occurs. As a result, an inexpensive white light source can be employed as the information light source 92.

In addition, since the curved surface of the hologram combiner 10 is curved in only one direction, the manufacturing of the hologram combiner 10 is easy.

As described above, according to this embodiment, a hologram display apparatus can be obtained in which, even when an inexpensive wide band light source such as a white light source is used as a reproducing light source, chromatic aberration hardly occurs.

Embodiment 2

Figure 3A:
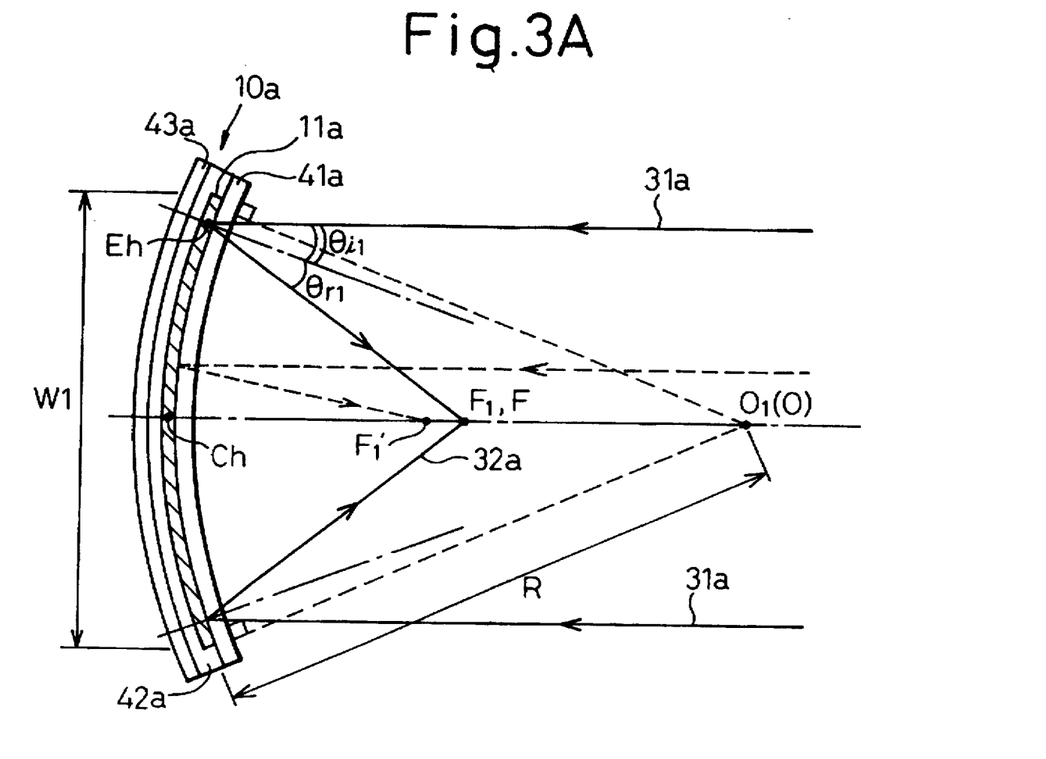
FIG. 3A is a schematic cross-sectional view of a hologram combiner according to the second embodiment of the present invention.
Figure 3B:
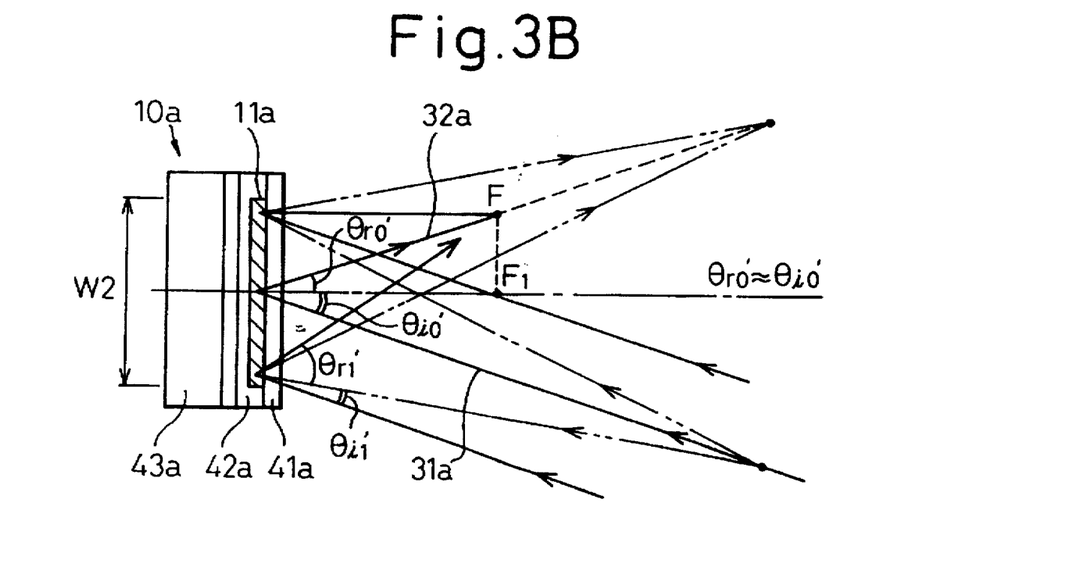
FIG. 3B is a longitudinal section of the hologram combiner of FIG. 3A.

FIG. 3A and FIG. 3B show a hologram display apparatus according to a second embodiment of the present invention. In this embodiment, the hologram 11a has an aspheric surface. Accordingly, the mirror in the hologram 11 also has an aspherical surface. In FIG. 3A and FIG. 3B, a reference symbol F denotes a focal position of the aspheric hologram 11a at its edge portion $E_h$; a reference symbol $F_1$ denotes a focal position of the aspheric mirror at the edge portion $E_h$; a reference symbol O denotes the center of curvature of the aspheric hologram 11a at the edge portion $E_h$; a reference symbol $O_1$ denotes the center of curvature of the aspheric mirror at the edge portion $E_h$; a reference symbol $F_1'$ denotes a focal position of the aspheric mirror at the center Ch of the aspheric surface in the first direction.

The focal position $F_1'$ at the center Ch of the aspheric mirror is different from the focal position $F_1$ of the aspheric mirror at its edge because of the aspheric surface. The amount of chromatic aberration is relatively large at the edge portion $E_h$.

According to this second embodiment of the present invention, the mirror in the hologram 11 is made in such a way that the center O of curvature of the hologram combiner 10 at its edge $E_h$ substantially coincides with the center $O_1$ of curvature of the aspheric mirror at its edge $E_h$ at which a relatively large amount of chromatic aberration is generated, whereby the chromatic aberration can be effectively suppressed.

Embodiment 3

Figure 4A:
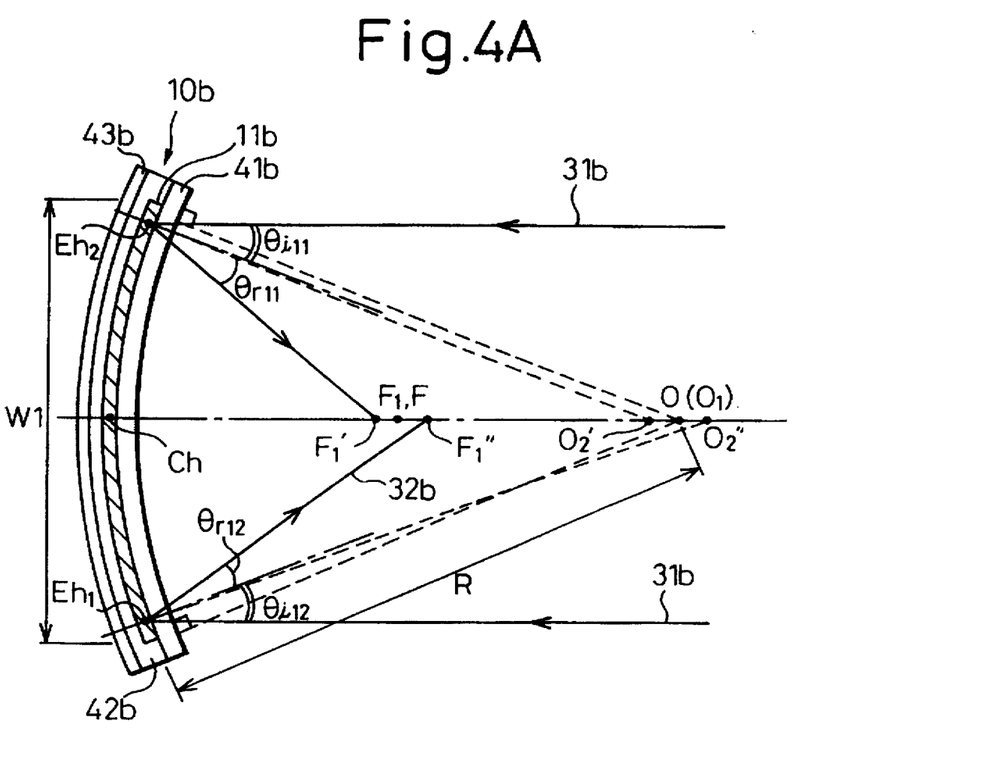
FIG. 4A is a schematic cross-sectional view of a hologram combiner according to the third embodiment of the present invention.
Figure 4B:
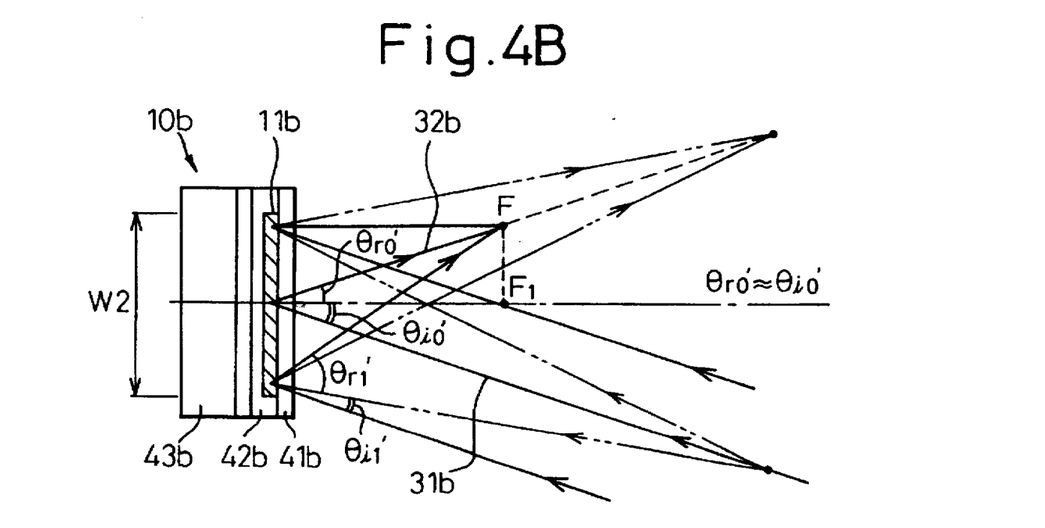
FIG. 4B is a longitudinal section of the hologram combiner of FIG. 4A.

FIG. 4A and FIG. 4B show a hologram display apparatus according to a third embodiment of the present invention. Similar to the second embodiment, the hologram 11b and the mirror in it have aspheric surfaces. In this embodiment, a focal position $F_1'$ at one end portion $E_{h1}$ is different from a focal position $F_1''$ at the other end portion $E_{h2}$. $Rf_1$ is the radius of curvature at the end portion $E_{h1}$ and $Rf_2$ is the radius of curvature at the end portion $E_{h2}$. The reference symbol $F_1$ in FIG. 4A and FIG. 4B represents an average position between the focal positions $F_1'$ and $F_1''$. That is, $(ChF_1'+ChF_1'')/2=ChF_1$. A reference symbol $O_2'$ is a center of curvature of the aspheric mirror at the end portion $E_{h1}$. The reference symbol $O_2'$ is a center of curvature of the aspheric mirror at the end portion $E_{h2}$ of the aspheric mirror. The reference symbol $O_1$ is an average center of curvature of the aspheric mirror, that is, $2 \cdot ChF_1 \approx ChO_1$. The reference symbol R is an average radius of curvature which is nearly equal to an average of $R_{f1}$ and $R_{f2}$. That is, $R=(R_{f1}+R_{f2})/2$, where $R_{f1}=2ChF_1'$, and $R_{f2}=2ChF_1''$, and $2ChF_1 \approx ChO_1$.

In this embodiment, since the radius of curvature at one end $E_{h1}$, is different from the radius of curvature at the other end $E_{h2}$, the chromatic aberrations are different at both ends. However, by making the radius of curvature of the combiner to be equal to the average of the radiuses of curvatures of the aspheric mirror at both ends, the amount of chromatic aberration can be made a minimum.

Embodiment 4

Figure 5A:
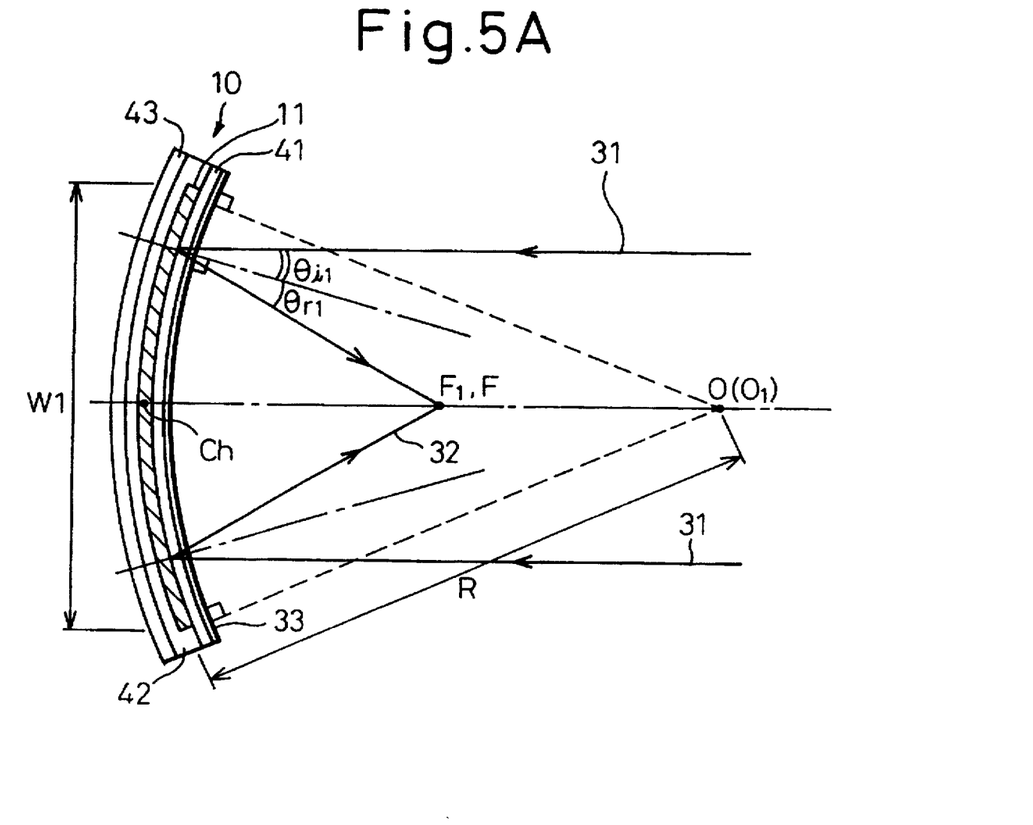
FIG. 5A is a schematic cross-sectional view of a hologram combiner according to the fourth embodiment of the present invention.
Figure 5B:
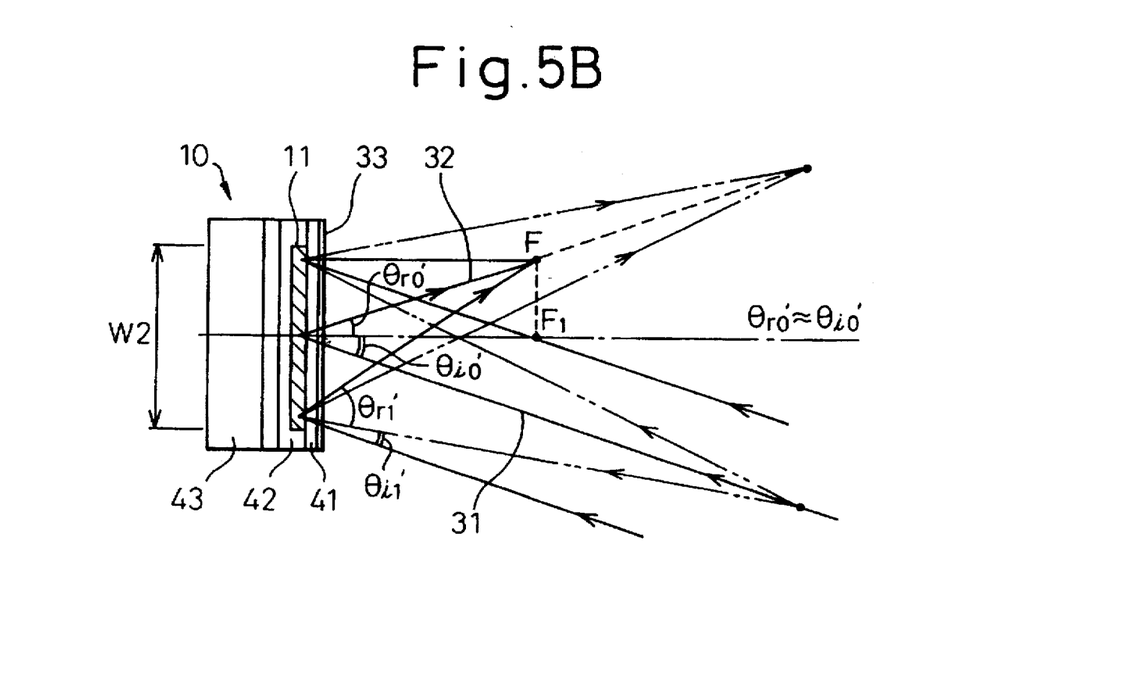
FIG. 5B is a longitudinal section of the hologram combiner of FIG. 5A.

FIG. 5A and FIG. 5B show a hologram display apparatus according to a fourth embodiment of the present invention. In this embodiment, a non-reflecting coating 33 is provided on the base plate 41 in the first embodiment shown in FIG. 1A so as to prevent an unwanted light which may be generated from the mirror surface when the non-reflecting coating is not provided.

It will be apparent to those skilled in the art that the non-reflecting coating shown in FIG. 5A and 5B may also be applied to the second or third embodiment of the present invention.

Embodiment 5

Figure 6:
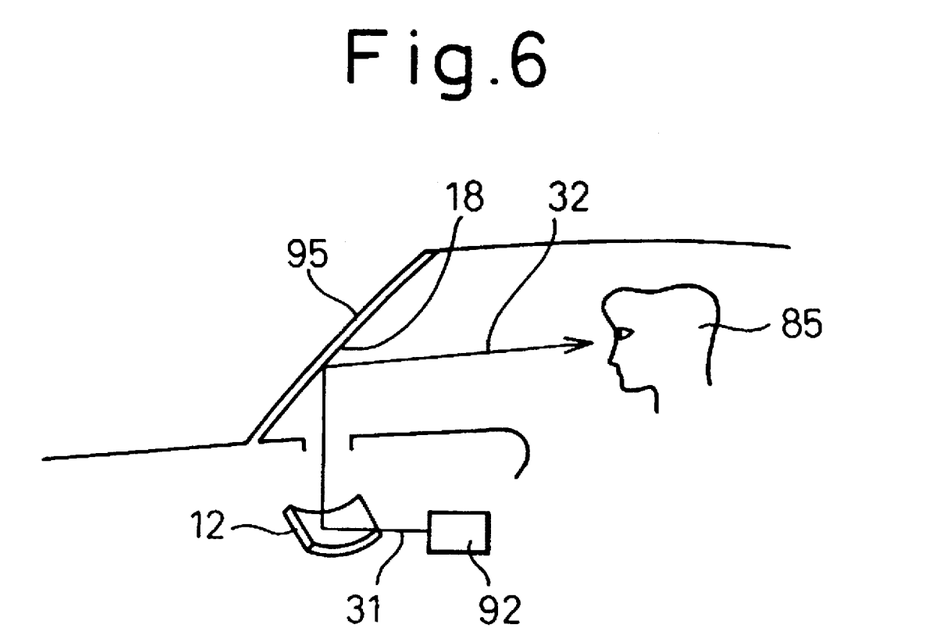
FIG. 6 is a system construction diagram showing a head up display according to the fifth embodiment of the present invention.

FIG. 6 shows a hologram display apparatus according to a fifth embodiment of the present invention. As shown in FIG. 6, an image combiner provided on a windshield glass 95 is not a hologram but is a well-known half mirror 18. In front of the half mirror 18, a hologram device 12 having a curved surface is provided. The curved surface of the hologram device 12 may be a cylindrical surface or a conical surface. The other construction is the same as the hologram display apparatus according to the first embodiment. By this construction also, the chromatic aberration can also be suppressed.

Embodiment 6

Figure 7:
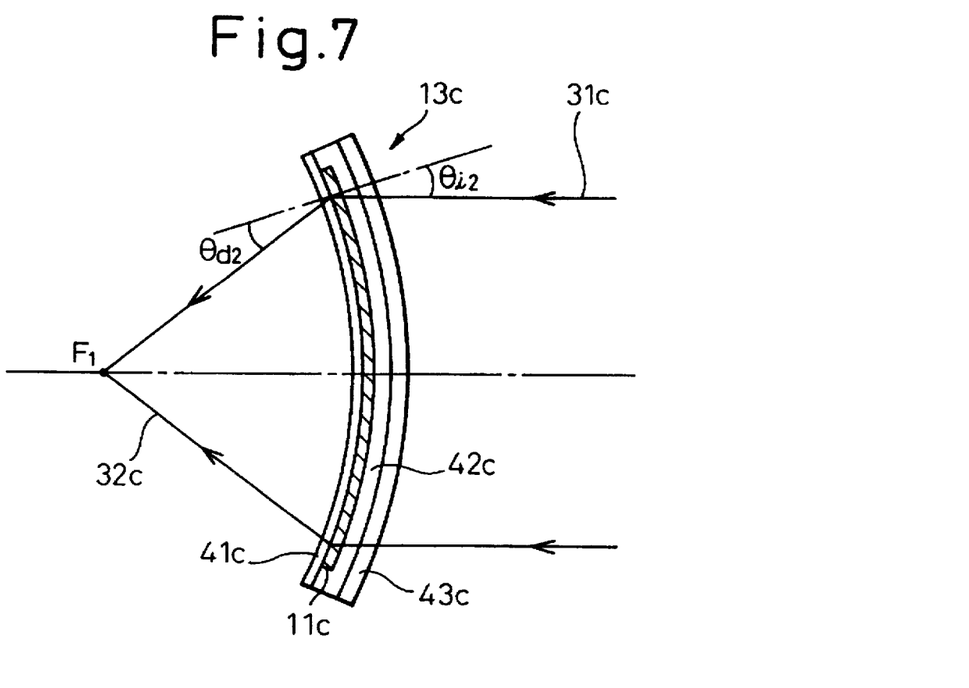
FIG. 7 is a schematic cross-sectional view of a hologram device and light paths according to the sixth embodiment of the present invention.

FIG. 7 shows a hologram display apparatus according to a sixth embodiment of the present invention. As shown in FIG. 7, in place of the reflecting type hologram device shown in FIG. 6, a transparent type hologram device 13 is employed. In FIG. 7, a hologram device 13a includes a transparent type hologram 11c having a diffraction characteristic of lens, a base plate 41c on which the hologram 11c sticks, a cover 43c and adhesives 42c for adhering the hologram to the base plate 41c and to the cover 43c. The hologram device 13a is located between the information light source 92 and the half mirror 18 shown in FIG. 6. A reproducing light 32c transmitted through the hologram device 13c is incident on the half mirror 18.

The center of curvature of the curved surface of the hologram device 13c is made to be almost the same as the center of curvature of the lens which is equivalent to the hologram.

The rest of the construction is the same as the hologram display apparatus according to the fifth embodiment shown in FIG. 6.

As a result, the difference between the incident angle $\theta_{i2}$ of the reproducing light 31c and the outgoing angle $\theta_{d2}$ of a diffracted light 32c can be made small so that the chromatic aberration of a hologram can be suppressed.

Embodiment 7

Figure 8:
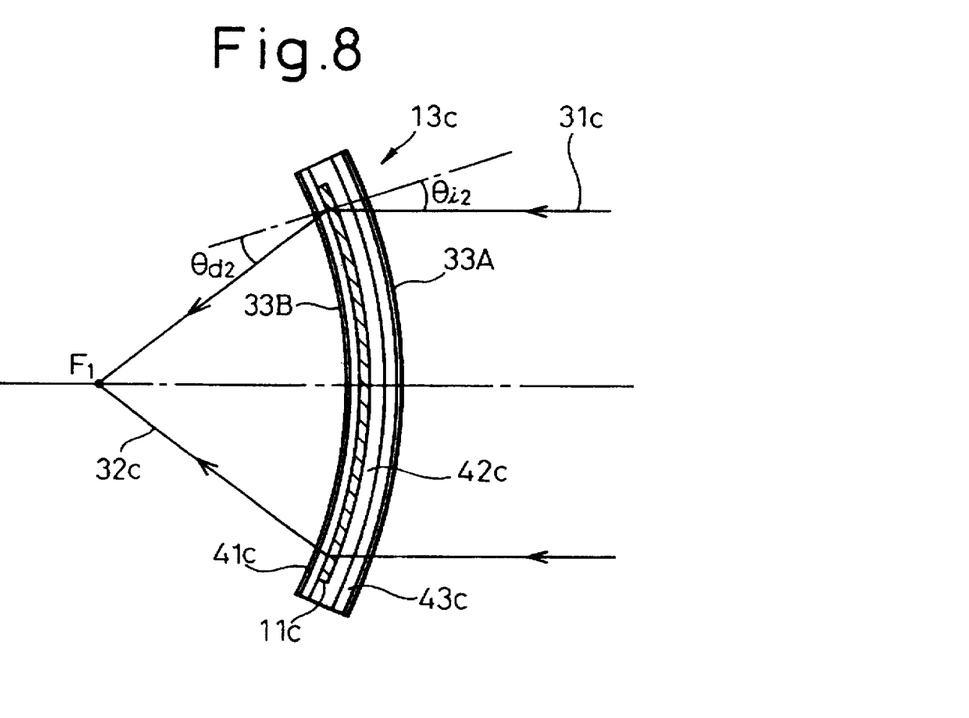
FIG. 8 is a schematic cross-sectional view of a hologram device and light paths according to the seventh embodiment of the present invention.

FIG. 8 shows a hologram display apparatus according to a seventh embodiment of the present invention. In this embodiment, non-reflecting coatings 33A and 33B are provided on both surfaces of the transparent-type hologram device 13c in the sixth embodiment shown in FIG. 7 so as to prevent unwanted light which may be generated from the mirror surface when the non-reflecting coating is not provided.

Embodiment 8

Figure 9:
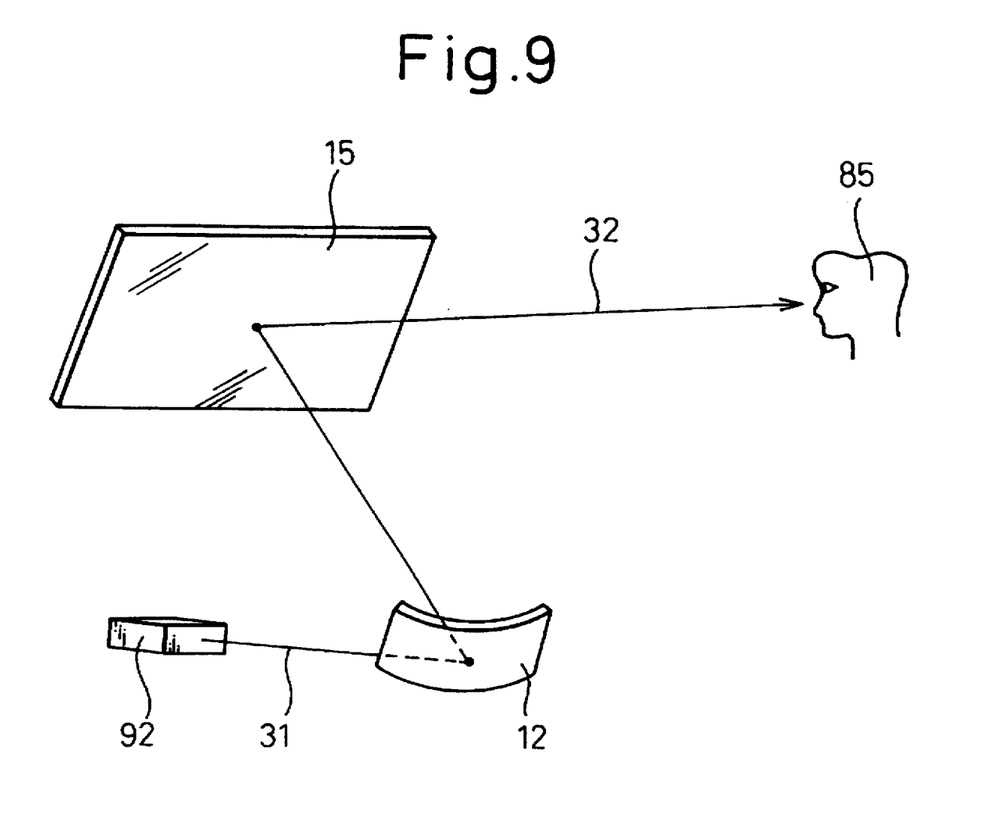
FIG. 9 is a system construction diagram showing a head up display apparatus according to the eighth embodiment of the present invention.

FIG. 9 shows a hologram display apparatus according to an eighth embodiment of the present invention. In this embodiment, in place of the half mirror 18 in the embodiment 4 shown in FIG. 6, a hologram combiner 15 is employed.

The reproduced light 31 is transmitted through the hologram device 12 and the hologram combiner 15 to the eyes of the observer 85. The holograms provided in the hologram device 12 and the hologram combiner 15 have diffraction characteristics of concave mirrors with focal distances of $f_1$ and $f_2$. The hologram device 12 has a cylindrical surface. Alternatively, the surface may be a conical surface. The hologram combiner 15 has a flat shape.

The radius $R_1$ of curvature of the cylindrical surface of the hologram device 12 is:

$$R1=2(f_1 \cdot f_2+f_1 \cdot L-L^2)/(f_1+f_2-L)$$

where L is the distance between the hologram device 12 and the hologram combiner 15.

Figure 10:
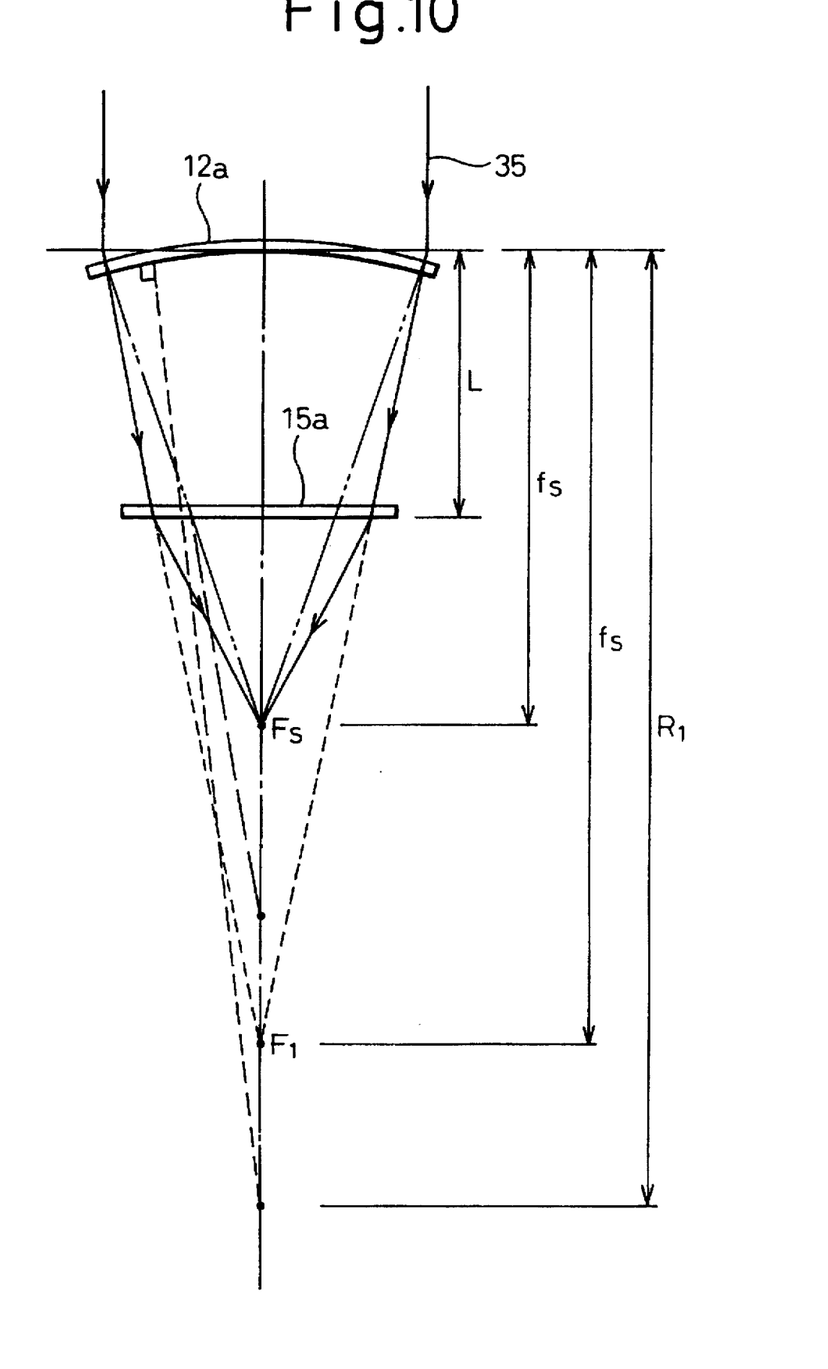
FIG. 10 is a schematic diagram of the light paths in the hologram device and the hologram combiner in the eighth embodiment.

FIG. 10 shows a schematic diagram in which the hologram device 12 and the hologram combiner 15 of the reflecting type in FIG. 9 are replaced by a hologram device 12a and a hologram combiner 15a both of transparent type, in order to easily see the relation between the light paths. It should be noted that the only change from FIG. 9 to FIG. 10 is that the positive and the negative relation of the focal lengths is changed. The distance between the hologram combiner 15a having a focal length $f_2$ and the hologram device 12a having a focal length $f_1$ is L. Parallel light rays 35 incident on the hologram device 12a are passed through both holograms 12a and 15a to be focused at a composite focus position $F_s$. The distance $f_s$ between the composite focus position $F_s$ and the hologram device 12a is expressed as:

$$f_s=(f_1 \cdot f_2+f_1 \cdot L-L^2)/(f_1+f_2-L)$$

The radius R1 of curvature of the hologram device 12a is set to be $2f_s$.

As a result, the angle difference between the incident angle and the outgoing angle at an end of the hologram device 12a can be made small so that the chromatic aberration can be suppressed.

The other construction is the same as the hologram display apparatus according to the fourth embodiment.

Embodiment 9

Figure 11:
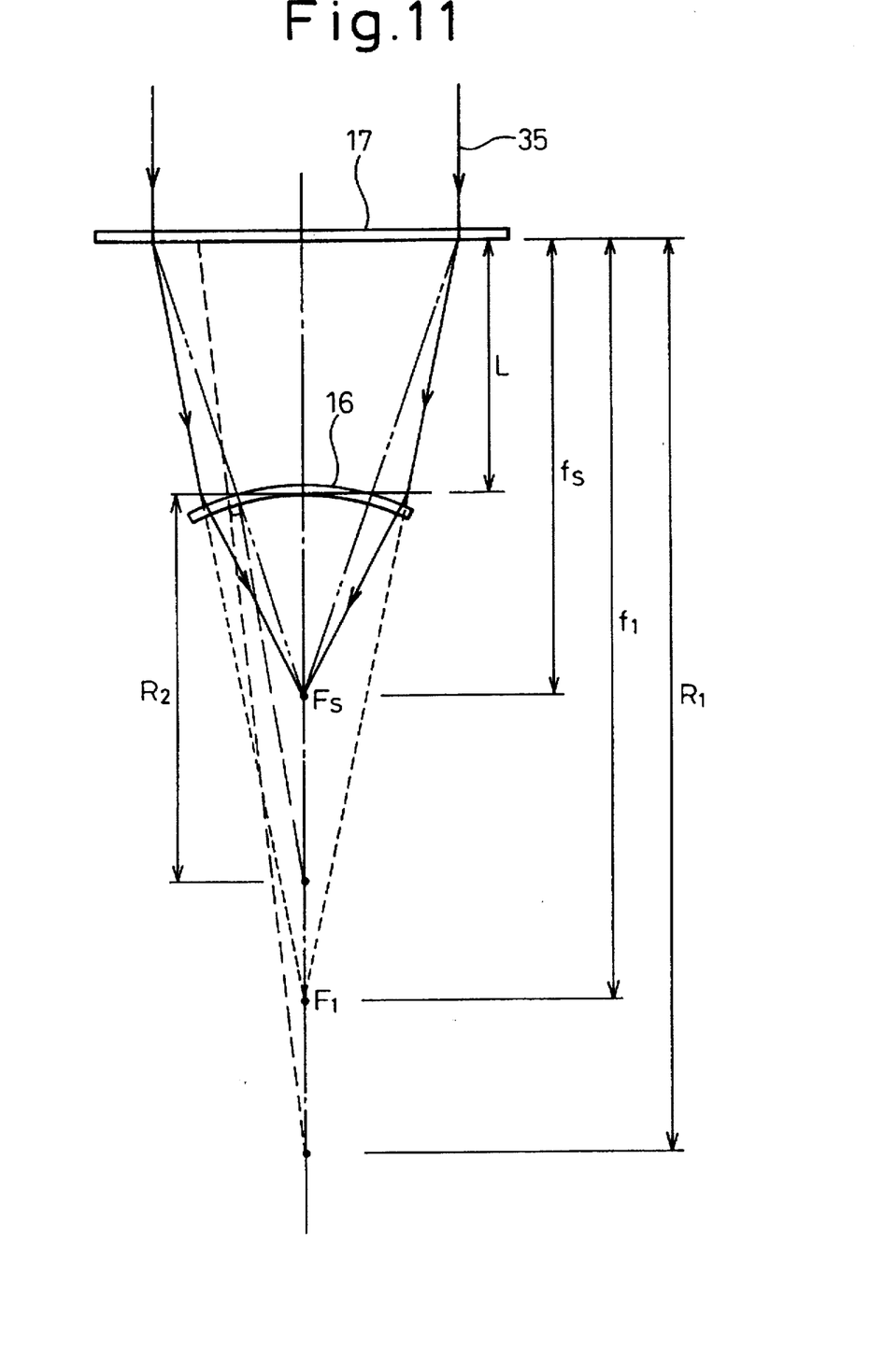
FIG. 11 is a schematic diagram of the light paths in the hologram device and the hologram combiner according to the ninth embodiment.

FIG. 11 shows a hologram display apparatus according to a ninth embodiment of the present invention. In FIG. 11, as an alternative to the plane-shaped hologram combiner 15a in the eighth embodiment shown in FIG. 10, a curved surface type hologram combiner 16 is employed, and, as an alternative to the curved surface hologram device 12a in the sixth embodiment shown in FIG. 10, a plane type hologram device 17 is employed.

The radius R1 of curvature of the hologram device 16 is expressed as:

$$R1=2(f_1 \cdot f_2-f_2 \cdot L)/(f_1+f_2-L)$$

$$f_s=(f_1 \cdot f_2+f_1 \cdot L-L^2)/(f_1+f_2-L)$$

Therefore, $R2=2f_s-2L$

As a result, similar to the embodiment 8, the angle difference between the incident angle and the outgoing angle at an end of the hologram device 16 can be made small so that the chromatic aberration can be suppressed.

The rest of the construction is the same as the hologram display apparatus according to the sixth embodiment.

From the foregoing description, it will be apparent that, according to the present invention, a hologram display apparatus can be obtained in which a chromatic aberration is hardly generated even when a light of a wide band is employed as a reproducing light.

What is claimed is:

1. A hologram display apparatus having a hologram device;

said hologram device including a first hologram with a diffraction characteristic of mirror or lens;

said hologram device being adapted to receive a signal light including information to be displayed and to generate, in response to said signal light, a reproduced light to be seen and acknowledged by an observer;

said hologram device having a first direction and a second direction perpendicular to said first direction;

said hologram device having a curved surface with a constant curvature in at least one of said first direction and said second direction; and the center of curvature of said curved surface being positioned at substantially the same position of the center of curvature of said mirror or lens equivalent to said hologram.

2. A hologram display apparatus as claimed in claim 1, wherein said curved surface has said constant curvature in said first direction, and is flat in said second direction.

3. A hologram display apparatus as claimed in claim 1, wherein said hologram device supports said hologram and comprises a transparent base plate located at the outgoing side of said reproduced light;

said transparent base plate being formed to have said curved surface.

4. A hologram display apparatus as claimed in claim 1, wherein said hologram device has a rectangular shape having a first side in said first direction and a second side in said second direction, said first side being longer than said second side.

5. A hologram display apparatus as claimed in claim 1, wherein the mirror or lens in said hologram has a characteristic of a spherical mirror or lens, the radius of curvature of said curved surface in said first direction being substantially the same as the radius of curvature of said spherical mirror or lens in said hologram.

6. A hologram display apparatus as claimed in claim 1, wherein the mirror or lens in said hologram is a magnifying mirror or lens having a characteristic of an aspheric mirror or lens, the radius of curvature of said curved surface in said first direction being substantially the same as the radius of curvature of an end portion of said mirror or lens equivalent to said hologram, said end portion being corresponding to an edge of an area adapted to be seen and acknowledged by said observer.

7. A hologram display apparatus as claimed in claim 6, wherein said magnifying lens has a first radius of curvature at one end in said first direction and a second radius of curvature at the other end in said first direction, said first radius being different from said second radius, the radius of curvature of said curved surface of said hologram being substantially equal to an average of said first radius and said second radius.

8. A hologram display apparatus as claimed in claim 1, wherein said hologram device is an image combiner for combining said signal light projected on the front side of said image combiner with a background light from the backside of said image combiner, the combined light being adapted to be seen and acknowledged by said observer.

9. A hologram display apparatus as claimed in claim 1, further comprising an image combiner for combining said signal light projected on the front side of said image combiner with a background light from the backside of said image combiner, the combined light being adapted to be seen and acknowledged by said observer, and said first hologram device being an optical element located in front of said image combiner, for projecting said signal light on said image combiner.

10. A hologram display apparatus as claimed in claim 1, wherein said hologram is a reflecting type hologram.

11. A hologram display apparatus as claimed in claim 1, wherein said hologram is a transparent type hologram.

12. A hologram display apparatus as claimed in claim 1, further comprising a second hologram device located, along a light path, in series with said first hologram device.

13. A hologram display apparatus as claimed in claim 12, said first hologram device having said curved surface is a hologram device for correcting chromatic aberration in said second hologram device.

14. A hologram display apparatus as claimed in claim 12, wherein:

said first hologram device is located at a front side along the light path;

said second hologram device is located at a rear side along the light path and has a flat shape;

said curved surface of said first hologram device has a radius R1 of curvature expressed as:

$$R1 = 2(f_1 \cdot f_2 + f_1 \cdot L - L^2)/(f_1 + f_2 - L)$$

where f1 is a focal length of said hologram in said first hologram device, f2 is a focal length of a hologram in said second hologram device, and L is the distance between both of said first hologram device and said second hologram device.

15. A hologram display apparatus as claimed in claim 12, wherein:

said first hologram device is located at a rear side along the light path;

said second hologram device is located at a front side along the light path and has a flat shape;

said curved surface of said first hologram device has a radius R1 of curvature expressed as:

$$R1 = 2(f_1 \cdot f_2 + f_2 \cdot L)/(f_1 + f_2 - L)$$

where f1 is a focal length of said hologram in said first hologram device, f2 is a focal length of a hologram in said second hologram device, and L is the distance between both of said first hologram device and said second hologram device.

16. A hologram display apparatus as claimed in claim 1, wherein said curved surface of said first hologram device is covered by a non-reflecting coating for preventing unwanted light due to reflection.

17. A hologram display apparatus as claimed in claim 1, wherein said hologram display apparatus is a head up display apparatus for a vehicle, comprising:

a windshield;

an image combiner provided on said windshield; and an information light source, provided in said vehicle, for emitting said signal light;

a view outside said vehicle can be seen and acknowledged by said observer through said image combiner, and an image reproduced from said signal light emitted from said information light source can be seen and acknowledged by said observer by overlapping said image on said sight.

18. A hologram display apparatus as claimed in claim 17, wherein a first direction of said curved surface of said hologram device is the right to left direction of said vehicle.

* * * * *